United States Patent
Creamer et al.

(10) Patent No.: US 7,085,821 B2
(45) Date of Patent: Aug. 1, 2006

(54) TCAP EVENT PROCESSING ENVIRONMENT

(75) Inventors: Thomas E. Creamer, Boca Raton, FL (US); Peeyush Jaiswal, Boca Raton, FL (US); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/172,265

(22) Filed: Jun. 14, 2002

(65) Prior Publication Data

US 2003/0233486 A1    Dec. 18, 2003

(51) Int. Cl.
*G06F 15/16*   (2006.01)
(52) U.S. Cl. ............................................. 709/219
(58) Field of Classification Search ................ 709/219, 709/227, 230
See application file for complete search history.

(56) References Cited

U.S. PATENT DOCUMENTS

| | | | |
|---|---|---|---|
| 5,479,495 A | 12/1995 | Blumhardt | 379/207 |
| 5,606,596 A * | 2/1997 | Jain et al. | 455/433 |
| 5,771,275 A | 6/1998 | Brunner et al. | 379/67 |
| 5,937,053 A * | 8/1999 | Lee et al. | 379/221.14 |
| 6,002,757 A | 12/1999 | Williams et al. | 379/207 |
| 6,236,722 B1 | 5/2001 | Gilbert et al. | 379/230 |
| 6,249,572 B1 | 6/2001 | Brockman et al. | 379/133 |
| 6,650,633 B1 * | 11/2003 | Albers et al. | 370/352 |

* cited by examiner

*Primary Examiner*—David Y. Eng
(74) *Attorney, Agent, or Firm*—Akerman Senterfitt

(57) ABSTRACT

A method of implementing a telephony service in a Transaction Capability Application Part (TCAP) processing system can include receiving a TCAP event from a signaling network and matching the received TCAP event to a TCAP markup language script implementation of a telephony service. The TCAP markup language script can be retrieved from a data store. The TCAP event can be processed in accordance with the TCAP markup language script to implement the telephony service.

20 Claims, 2 Drawing Sheets

TCAP EVENT PROCESSING ENVIRONMENT

BACKGROUND OF THE INVENTION

1. Technical Field

The invention relates to the field of telephony and, more particularly, to the field of telephony signaling interfaces.

2. Description of the Related Art

Telecommunication companies continually create new telephony services and/or features (collectively "services") to be offered to subscribers. These services include a voice processing component as well as a transaction processing component. Transaction Capability Application Part supports the exchange of transactional information between signaling points within a telephone network, and accordingly, can support a variety of services such as querying a service control point (SCP) in a signaling network to determine a routing number for an 800, 888 or 900 directory number, validating calling and/or credit card information, calling name delivery (CND), and local number portability (LNP).

The development of a new telephony service is a costly and time consuming task. Conventionally, TCAP event processing has been implemented within the same environment, e.g. the telephony switch, as call processing. Because telephony services have been implemented on the telephony switch level, the development of new services often requires specialized personnel having a significant amount of experience in programming the particular telephony switch upon which the service is to be implemented. In addition, the low level manner in which a telephony service is implemented requires developers not only to have knowledge of the telephony switch, but also significant knowledge and understanding of various underlying telecommunications protocols and call processing functions. After development, highly trained personnel again are needed to identify and isolate problems, as well as to ensure that the telephony service functions properly and does not interfere with other telephony services.

The development of telephony services is further complicated by the fact that telephony switches often employ proprietary internal protocols and operating systems. Thus, while a developer may be knowledgeable regarding one particular type of telephony switch, that developer typically cannot implement the same feature on another type of telephony switch with any degree of efficiency. The proprietary nature of telephony switches serves to limit the number of available developers for a given telephony switch, thereby increasing the cost of developing telephony services. Further adding to the cost of telephony service development is that telephony services are not easily ported over from one type of telephony switch to another. In consequence, similar and like features must be redesigned for each telephony switch.

SUMMARY OF THE INVENTION

The invention disclosed herein provides a telephony transaction processing architecture which facilitates the processing of Transaction Capability Application Part (TCAP) events through the use of standardized scripting languages. In particular, the present invention can provide an environment in which a scripting language, such as a TCAP enabled version of Extensible Markup Language, referred to as TCAP XML, can be used to process TCAP events. According to the invention, received directory numbers can be correlated to TCAP markup language scripts, for example TCAP XML scripts which, when executed, implement particular transactional aspects of telephony services. As the telephony services are coded in a scripting language similar to XML, the telephony services can be written by developers having little or no knowledge of telephony protocols and/or switching functions. Moreover, the XML application data can be developed using standard Web developing tools.

One aspect of the present invention can include a method of implementing a telephony service in a TCAP processing system. The method can include receiving a TCAP event from a signaling network and matching the received TCAP event to a TCAP markup language script implementation of a telephony service. For example, a called directory number can be identified from the received TCAP event. The identified directory number can be matched to a network location of a TCAP markup language script implementation of a telephony service. Notably, the directory number can be registered for the TCAP markup language script implementation of the telephony service.

The method also can include transmitting the called directory number and the network location of the TCAP markup language script to a transaction session manager. The transaction session manager can determine whether an event context for the received TCAP event exists in a cache. If no event context for the received TCAP event exists in the cache, an event context can be created for the received TCAP event.

The TCAP markup language script can be retrieved from a data store. For example, the network location can be provided to a TCAP markup language parser, which can retrieve the TCAP markup language script from the network location. The parser can parse the TCAP markup language script into an intermediate format which can be provided to the transaction session manager. The transaction session manager can provide the parsed TCAP markup language script to a transaction service processor for executing the TCAP markup language script. The received TCAP event can be processed in accordance with the TCAP markup language script to implement the telephony service.

Another aspect of the present invention can include a system for implementing a telephony service. The system can include a transaction service processor having addresses of TCAP markup language script implementations of telephony services associated with directory numbers. The transaction service processor can be configured to execute parsed versions of the TCAP markup language scripts to implement the telephony services. The system also can include a TCAP markup language parser configured to retrieve the TCAP markup language scripts from the associated addresses and parse the TCAP markup language scripts. The system further can include at least one transaction session manager as well as a TCAP event processor. The transaction session managers can be configured to coordinate the operation of the TCAP markup language parser and the transaction service processor. The TCAP event processor can be configured to receive TCAP events from a signaling network and provide the TCAP events to the transaction service processor.

The TCAP markup language parser, the transaction session manager, and the transaction service processor each can run within an independent virtual machine. Moreover, the TCAP markup language parser, the transaction service processor, and the transaction session manager each can be disposed within a separate computing machine. The system also can include a data store including the TCAP markup language scripts, and a server communicatively linked to the data store and the TCAP markup language parser for facilitating the retrieval of the TCAP markup language scripts. The system further can include a cache memory disposed between the transaction session manager and the TCAP markup language parser. The cache memory can be configured to store parsed versions of frequently retrieved TCAP markup language scripts.

The system can include a call processing component which can include a call processor unit configured to receive calls and a voice markup language parser. The call processor unit can include addresses of voice markup language document implementations of telephony services associated with the directory numbers. The voice markup language parser can be configured to retrieve the voice markup language documents from the addresses and parse the voice markup language documents responsive to receiving the calls. The system also can include a service processor and one or more session managers. The service processor can be configured to execute the parsed voice markup language documents to implement the telephony services. The session managers can be configured to coordinate the operation of the voice markup language parser and the service processor.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a telephony transaction processing architecture which facilitates the processing of Transaction Capability Application Part (TCAP) events through the use of standardized scripting languages. The architecture can include several logically distinct components for processing received TCAP events. In particular, the present invention can provide an environment in which a scripting language, such as a TCAP enabled version of Extensible Markup Language (XML), referred to as TCAP XML, can be used to process TCAP events. According to the invention, received directory numbers can be correlated to TCAP markup language scripts, such as TCAP XML, which when executed, implement particular transactional aspects of telephony services.

Figure 1:
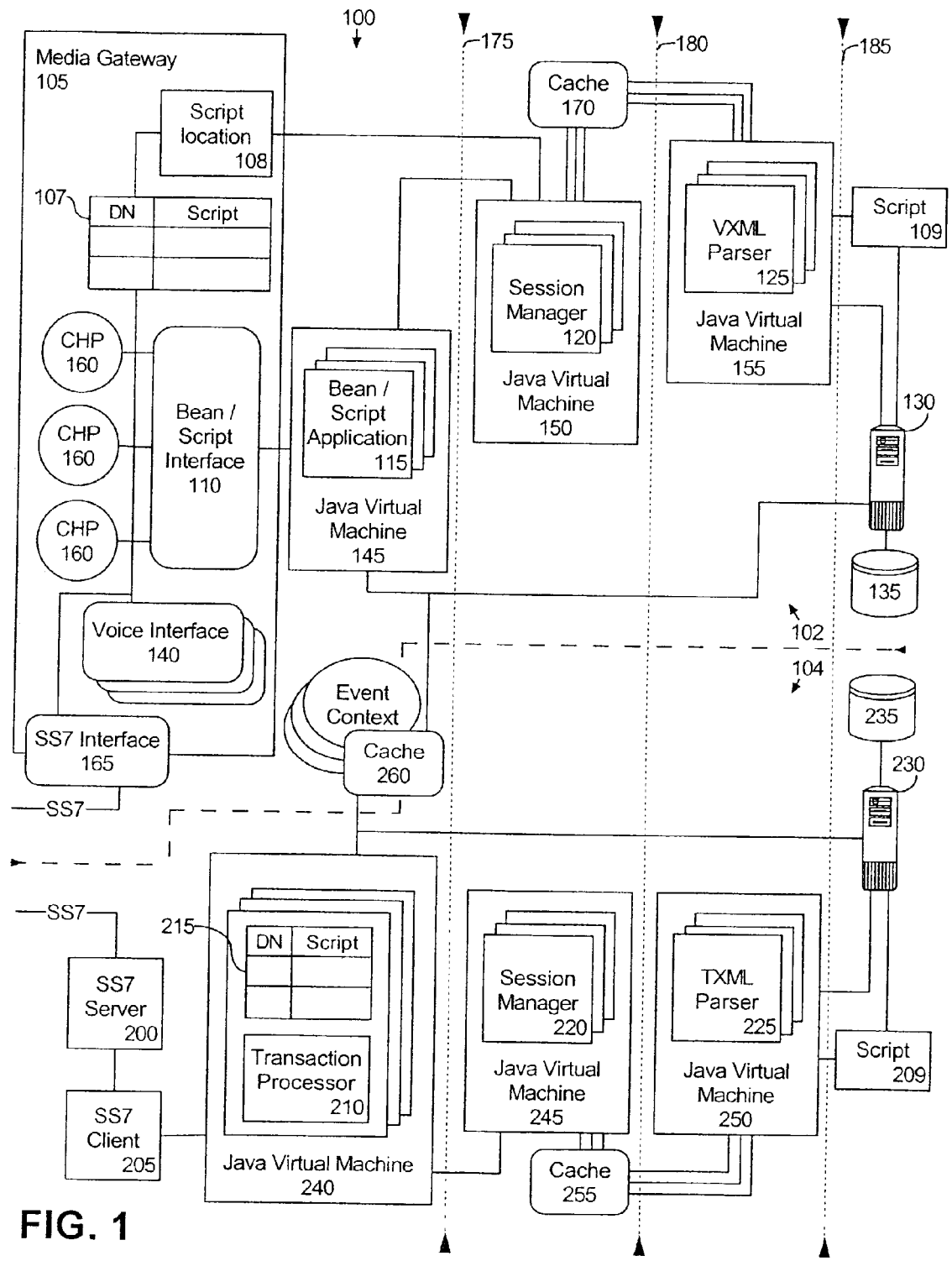
FIG. 1 is a schematic diagram illustrating a system having a call processing component and a transaction processing component in accordance with the inventive arrangements disclosed herein.

FIG. 1 is a schematic diagram illustrating an exemplary system 100 for implementing a telephony service and/or feature (hereinafter "service") in accordance with the inventive arrangements disclosed herein. As shown in FIG. 1, the system 100 can include a call control component 102 as well as a transactional processing component 104. The call control component 102 and the transactional processing component 104 can be communicatively linked via a cache 260. The call control component 102 can include a media gateway 105, bean/script applications (service processors) 115, session managers 120, VXML parsers 125, a hyper-text transfer protocol (HTTP) server 130, and a data store 135. The data store 135 can include one or more VXML scripts specifying documents, audio, text, and the like. The VXML scripts, for example script 109, are script implementations specifying call control aspects of telephony services. The VXML scripts within the data store 135 can be accessed via the HTTP server 130. It should be appreciated that although the data store 135 is depicted as a single data store, it can be implemented as one or more distributed data stores.

The media gateway 105 can be communicatively linked to one or more telecommunication trunk lines (not shown) such as T1 lines and/or ISDN lines. Each incoming telecommunication trunk line can be interfaced with a channel processor 160 serving as an interface between the media gateway 105 and the telecommunications trunk line. One channel processor 160 can be included for each voice circuit of a corresponding telephony switch. The media gateway 105 also can include an application table 107 and a bean/script interface 110. The application table 107 can specify associations between dialed number inbound services (DNIS), and the VXML script implementations of telephony services stored in data store 135. More specifically, the application table 107 maintains a listing of DNISs and telephony services for which the DNISs have been registered. The application table 107 further specifies network locations from which the various VXML script implementations of the telephony services can be retrieved.

Accordingly, upon receiving an incoming call, the media gateway 105 can determine the DNIS specified by the incoming call. The DNIS can be matched to one or more VXML scripts using the application table 107. Thus, the locations or addresses of the VXML script implementations of the telephony services for which the DNIS has been registered can be identified. The locations of the VXML scripts of the telephony services can be provided to the session managers 120.

The media gateway 105 also can include a signaling system number 7 (SS7) interface 165. The SS7 interface 165 can include a Message Transfer Part (MTP) interface as well as an ISDN User Part Interface (ISUP). The SS7 interface 165 of the media gateway 105 can support those protocols necessary to set up and tear down calls and support voice communications. For example, the MTP interface can support services for the physical layer, the data link layer, and the network layer. The MTP interface can facilitate reliable exchange of signaling messages between two communicating endpoints. Through the use of MTP, one may perform tasks such as flow control, error checking, and message sequencing between the endpoints. The MTP interface also can provide the services necessary for ensuring the delivery between signaling points by performing addressing, routing, and congestion control. The ISUP interface can provide the necessary call control services that can be used during the establishment and termination of calls over a PSTN. Notably, the ISUP interface can be utilized to determine which procedures are appropriate for setting up, maintaining and tearing down trunk calls on the signaling network.

The bean/script interface 110, which can include bridge services or functions for connecting one local area network (LAN) to another LAN, can be included in the media gateway 105. The bean/script interface 110 can facilitate communications between the service processors 115 and the other components of the media gateway 105 such as the channel processors 160 and the voice interface 140. The bean/script interface 110 can be configured to support the range of functionality that can be provided through the VXML scripts as interpreted by the service processors 115 to be discussed herein. Notably, as the VXML scripts can support extended call control and transaction capabilities application part (TCAP) functions, the bean/script interface 110 also can be configured to support those call control and TCAP functions. The voice interface 140 can provide speech recognition as well as text-to-speech (TTS) functions. Accordingly, speech received via the telecommunications trunk lines can be converted to text, and text data can be converted to an audio stream to be provided to one or more subscribers via the-telecommunications trunk lines.

Taken together, the service processors 115, the session managers 120, and the VXML parsers 125, provide the components of a distributed voice browser. The VXML parsers 125 can be instantiated at runtime and can retrieve the VXML scripts from the data store 135 via the HTTP server 130. The VXML parsers 125 can convert the retrieved VXML scripts into an intermediate format which can be mapped to, and interpreted by, the service processors 115. Notably, the VXML scripts can be enhanced to include new tags defining TCAP transactions such as Allow Call, Block Call, Forward Call, Selective Forward Call, and Bridge Call. Accordingly, the VXML parser 125 also can be configured to identify any additional tag enhancements to the VXML scripts.

The service processors 115 can be reusable software components which can be combined with other components in the same or different computer system in a distributed computing environment. One service processor 115 can be instantiated at runtime for each channel processor 160, and thus, can be associated with that particular channel processor. The service processors 115 effectively serve as interpreters which provide the execution environment for the parsed VXML scripts to implement the telephony services specified by the VXML scripts. Accordingly, the service processors 115 match the internal functionality of the media gateway 105 with the parsed VXML script representation of the telephony service. As shown, the service processors 115 can be communicatively linked to the voice interface 140 of the media gateway 105. Thus, the service processors 115 can access TTS and speech recognition functions for implementing the telephony service as specified by the parsed VXML script. For example, text and recognized speech can be used to populate fields of a VXML script, form, and/or document.

Notably, the service processors 115 and the VXML parsers 125 can execute within Java virtual machines 145 and 155 respectively. Although FIG. 1 depicts a plurality of service processors 115 and VXML parsers 125 executing within individual Java virtual machines 145 and 155, each of the service processors 115 and the VXML parsers 125 can execute within an individual Java virtual machine thereby minimizing the risk that an error occurring within one program will adversely affect another.

Each of the service processors 115 and the VXML parsers 125 can register with the session managers 120. Accordingly, the session managers 120 can track which service processors 115 and VXML parsers 125 are available for call processing. The session managers 120 further can coordinate the operation of a service processor 115/VXML parser 125 pair. The session manager 120 can pass information between service processors 115 and VXML parsers 125. In particular, requests provided to the session managers 120 from the media gateway 105 can include the called directory number, one or more universal resource identifiers (URI), including universal resource locators (URLs), specifying one or more VXML script representations of telephony services, and an identifier representing the particular channel processor upon which the call was received. The session managers 120 can save the information in a local data store. As such, the session managers 120 can determine a free VXML parser 125 to which the received URI can be provided. Additionally, results from the VXML parsers 125 can be provided back to the proper service processor 115 according to the saved URI, called directory number, and channel processor identifier.

As was the case with the service processors 115 and the VXML parsers 125, a plurality of session managers 120 can execute within a single Java virtual machine, or each session manager 120 can execute within an individual Java virtual machine. In any case, as mentioned, the service processors 115, the session managers 120, and the VXML parsers 125 can exist in separate computing machines distributed throughout a computing network. Further, these various components can be replicated as needed to support increased processing loads. In consequence, the service processors 115, the session managers 120, and the VXML parsers 125, when taken together, provide a distributed voice browser architecture which can be scaled to support a large volume of system requests. A cache memory 170 can be disposed between the session managers 120 and the VXML parsers 125. The cache memory 170 can increase system performance by reducing multiple fetching and parsing of frequently used VXML scripts.

The transactional processing component 104 can include an SS7 TCAP server 200, an SS7 TCAP client 205, TCAP bean/script applications (transaction service processors) 210, transaction session managers 220, TCAP XML parsers 225, a hyper-text transfer protocol (HTTP) server 230, and a data store 235. The data store 235 can include one or more TCAP XML scripts, such as script 209, specifying transactions to be performed in accordance with one or more telephony services. For example, the TCAP XML scripts can implement 800 number translation, database querying, Short Message Service (SMS), Local Number Portability, and other transaction-based services or service aspects. The TCAP XML scripts within the data store 235 can be accessed via the HTTP server 230. It should be appreciated that although the data store 235 is depicted as a single data store, it can be implemented as one or more distributed data stores.

The SS7 server 200 can provide an interface to the signaling network, in this case the SS7 network. In particular, the SS7 server 200 can include an MTP interface, a Signaling Connection Control Part Interface (SCCP), as well as a TCAP interface. The SCCP interface can provide addressing capabilities to applications within a signaling point. For example, the SCCP interface can be utilized for addressing the applications that provide 800 number call processing, advanced intelligent network (AIN) services, calling or credit card processing services and custom local area signaling services (CLASS). The SS7 server 200 can provide other interfaces, for example, a mobile application part (MAP) interface, an intelligent network (IN) interface, and an advanced intelligent network (AIN) interface or an IN (ITU-T/ETSI CS1/2) interface. These interfaces can be used to either augment existing services or provide new service capabilities or enhancements.

The TCAP interface can be an application-based interface which can provide the services necessary for supporting non-circuit related activities including the exchange of transaction-related information between network entities. The TCAP interface can, for example, utilize the SCCP interface for delivering messages to applications. Notably, the TCAP interface can provide the services necessary for 800 number transactions, calling or credit card transactions, as well as AIN and CLASS transactions. The SS7 client 205 can include a library of APIs that can be used to interact with the SS7 server 200. Additionally, the SS7 client 205 can facilitate communications with the transaction processors 210 through a Java enabled TCAP interface, also referred to as a Java enabled TCAP application protocol interface.

The TCAP XML parsers 225 can be instantiated at runtime and can retrieve the TCAP XML scripts from the data store 235 via the HTTP server 230. The TCAP XML parsers 225 can convert the retrieved TCAP XML scripts into an intermediate format which can be mapped to, and interpreted by, the transaction service processors 210. The TCAP XML scripts can include tags defining TCAP transactions such as Allow Call, Block Call, Forward Call, Selective Forward Call, and Bridge Call. Accordingly, the TCAP XML parser 225 also can be configured to identify any TCAP related tags within the TCAP XML scripts.

The transaction service processors 210 can be reusable software components which can be combined with other components in the same or different computer system in a distributed computing environment. The transaction service processors 210 can be configured to communicate with the SS7 client 205 via a Jave enabled TCAP interface. One transaction service processor 210 can be instantiated at runtime for each received TCAP event, or alternatively, one or more transaction service processors can remain in operation to receive TCAP events. In any case, additional transaction service processors 210 can be instantiated as needed to process additional TCAP events. Each of the transaction service processors 210 can be associated with a copy of an application table 215. The application table 215 can specify associations between DNISs, and the TCAP XML script implementations of telephony services stored in data store 235. More specifically, the application table 215 maintains a listing of DNISs and telephony services for which the DNISs have been registered. The application table 215 further specifies network locations from which the various TCAP XML script implementations of the telephony services can be retrieved.

Upon receiving a TCAP event through a TCAP interface from the SS7 client 205, a transaction service processor 210 can be instantiated. The transaction service processor 210 can receive the DNIS specified by the incoming TCAP event from the TCAP client 205. The transaction service processor 210 can match the DNIS to one or more TCAP XML scripts using the application table 215. Thus, the locations or addresses of the TCAP XML script implementations of the telephony services for which the DNIS has been registered can be identified. The locations of the TCAP XML scripts of the telephony services can be provided to the transaction session managers 220. The transaction service processor 210 also serve as interpreters which provide the execution environment for the parsed TCAP XML scripts to implement the transactional aspects of telephony services. Through the TCAP interface, the transaction service processors 210 can interact with a TCAP stack to implement the transaction based services defined by the TCAP XML scripts.

Notably, the transaction service processors 210 and the TCAP XML parsers 225 can execute within Java virtual machines 240 and 250 respectively. Although FIG. 1 depicts a plurality of transaction service processors 210 and TCAP XML parsers 225 executing within individual Java virtual machines 240 and 250, each of the transaction service processors 210 and the TCAP XML parsers 225 can execute within an individual Java virtual machine thereby minimizing the risk that an error occurring within one program will adversely affect another.

Each of the transaction service processors 210 and the TCAP XML parsers 225 can register with the transaction session managers 220. Accordingly, the transaction session managers 220 can track which transaction service processors 210 and TCAP XML parsers 225 are available for call processing. The transaction session managers 220 further can coordinate the operation of a transaction service processor 210/TCAP XML parser 225 pair. The transaction session manager 220 can pass information between transaction service processors 210 and TCAP XML parsers 225.

For example, TCAP events provided to the transaction session managers 220 from the transaction service processors 210, after being matched to an appropriate TCAP XML script from the application table 215, can specify the DNIS, one or more universal resource identifiers (URI), including universal resource locators (URLs), specifying one or more TCAP XML script representations of telephony services, a TCAP identifier, and a transaction processor identifier. The transaction session managers 220 can save the information in a local data store. Accordingly, the transaction session managers 220 can determine a free TCAP XML parser 225 to which the received URI can be provided. Additionally, results from the TCAP XML parsers 225 can be provided back to the proper transaction service processor 215 according to the saved URI, the DNIS, and transaction processor identifier.

As was the case with the transaction service processors 210 and the TCAP XML parsers 225, a plurality of transaction session managers 220 can execute within a single Java virtual machine, or each transaction session manager 220 can execute within an individual Java virtual machine. In any case, as mentioned, the transaction service processors 210, the transaction session managers 220, and the TCAP XML parsers 225 can exist in separate computing machines distributed throughout a computing network. Further, these various components can be replicated as needed to support increased processing loads. In consequence, the transaction service processors 210, the session managers 220, and the TCAP XML parsers 225, when taken together, provide a distributed TCAP event processing architecture having distinct logical components which can be scaled to support a large volume of TCAP events.

A cache memory 255 can be disposed between the transaction session managers 220 and the TCAP XML parsers 225. The cache memory 255 can increase system performance by reducing multiple fetching and parsing of frequently used TCAP XML scripts. The inventive arrangements disclosed herein further can include one or more firewalls 175, 180, and 185. Although firewalls are not necessary for operation of the system 100 as disclosed herein, the addition of the firewalls provides added network security. In particular, firewalls 175 and 180 provide double firewall protection as required by many telecommunications companies. Firewall 185 can provide isolation of the XML parsers from corporate or other private networks.

The call processing component 102 and the transactional processing component 104 can be communicatively linked by an event context cache 260. The event context cache 260 can be an asynchronous cache wherein the entries have a life cycle of only several seconds. The transactional processing component 104 can store information regarding a call, a TCAP event, or service within the event context cache 260. The information stored in the context cache by the transactional processing component 104 can be accessed by the call processing component 102 to provide the call processing component 102 with an indication as to how to process a call that is transferred from the transactional processing component 104 to the call processing component 102.

For example, when executing a TCAP XML script, the transaction service processors 210 can make an entry in the context cache 260. Though each entry is maintained for only a few seconds, the entry can specify information including the DNIS, the calling number, as well as a service name or URI, for example a VXML script to be executed, as well as any parameters which may be needed by the VXML script for execution. When the call processing component receives a transferred call, the call processing component 102 can access the context cache 260 to determine a proper course of action for processing the call, rather than querying the transaction processing component 104 through a service-to-service messaging protocol.

Figure 2:
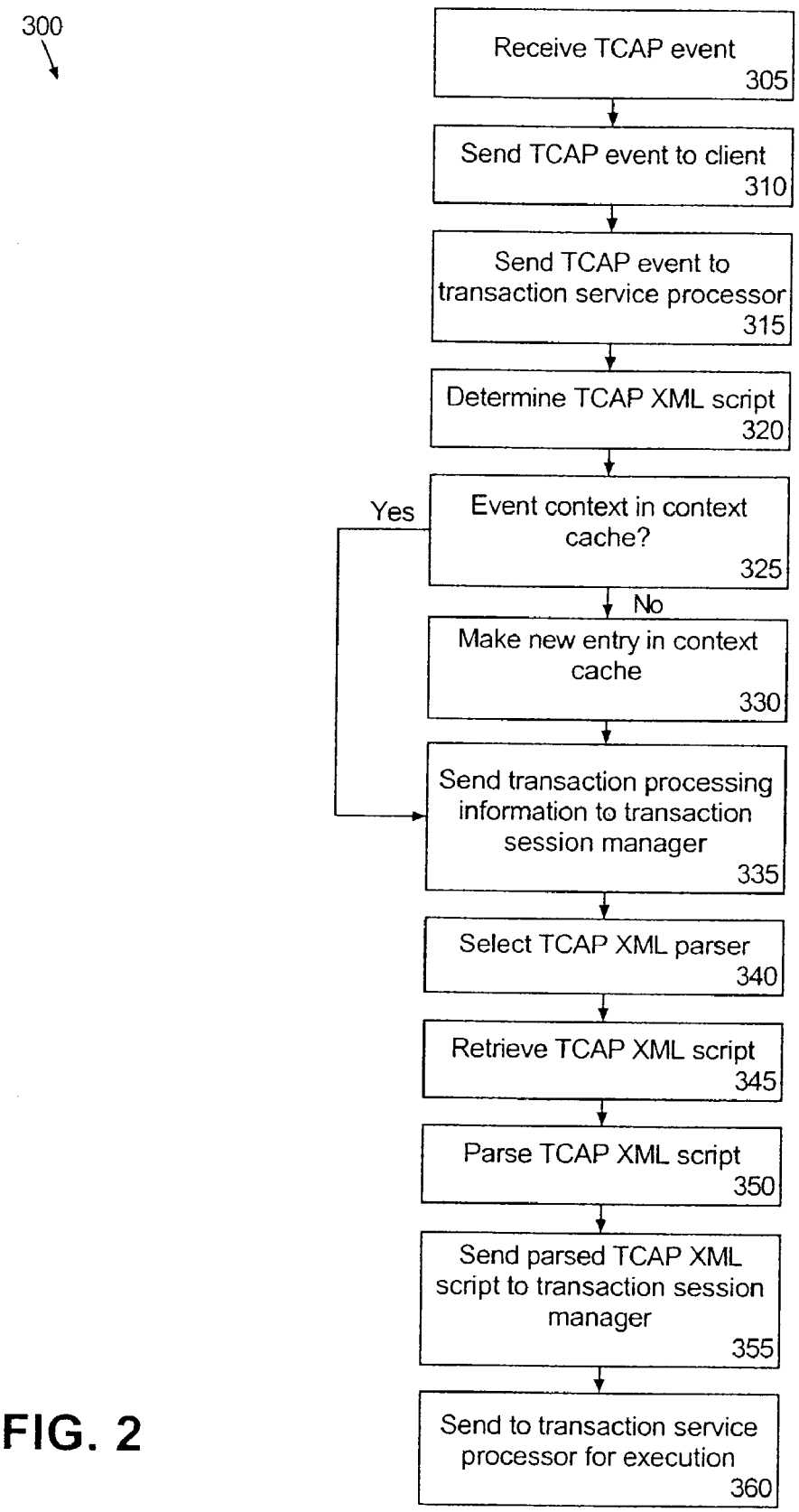
FIG. 2 is a flow chart illustrating a method of processing transaction events received from a signaling network as performed by the system of FIG. 1.

FIG. 2 is a flow chart illustrating a method 300 of implementing transactional aspects of a telephony service as performed by the system of FIG. 1. The method 300 can begin in a state wherein the system of FIG. 1 has instantiated at least one transactional service processor. Additionally, one or more parsers, such as TCAP XML parsers, can be instantiated such that the transaction service processors and the parsers have registered with the transaction session managers. Notably, there need not be a one to one correspondence between the service processors and the parsers. In any event, in step 305, the SS7 server can receive a TCAP event from the signaling network. In step 310, the received TCAP event can be sent to the SS7 client over an IP connection.

The TCAP event then can be provided to a transaction service processor in step 315. The TCAP event can specify a DNIS and a calling directory number. Accordingly, in step 320, one or more TCAP XML scripts which are associated with the DNIS can be identified. For example, the listing of DNISs and associated TCAP XML scripts can be consulted to determine the particular TCAP XML script implementations of telephony services for which the DNIS has been registered.

In step 325, a determination can be made as to whether an entry corresponding to the received TCAP event has been made in the event context cache. If so, the method can proceed to step 335. If not, however, the method can continue to step 330 where an entry can be made in the event context cache. The entry in the context cache can include the DNIS, the calling directory number, one or more associated VXML call processing scripts, as well as any parameter data that may be required by the specified VXML call processing scripts.

In step 335, the transaction service processor can send at least the following information to the transaction session manager via a TCP/IP connection: the DNIS, one or more URIs specifying TCAP XML script implementations of telephony services for which the directory number has been registered, an identifier representing the particular transaction processor to which the TCAP event was initially assigned, as well as a TCAP identifier. Although not shown in FIG. 2, prior to transmitting the URI to an available parser, the transaction session manager can query the cache memory via a TCP/IP connection to determine whether the TCAP XML script specified by the URI is contained within the cache memory. If so, the TCAP XML script has already been parsed by the parser and exists in an intermediate format which can be executed by the transaction service processors. Accordingly, the parsed TCAP XML script can be retrieved from the cache memory and provided to the session managers, thereby skipping steps 340, 345, 350, and continuing with step 355.

In step 340, the transaction session manager can identify an available parser and provide the URI to the parser through a TCP/IP connection. Notably, the transaction session manager can save a local copy of the transaction processor identifier. In step 345, the parser can issue an HTTP request to an HTTP server to retrieve the TCAP XML script specified by the URI. The TCAP XML script can implement services such as Allow Call, Block Call, Forward Call, Selective Forward Call, Bridge Call, as well as other functions including querying network databases, and the like. In step 350, the parser can receive the requested TCAP XML script via an HTTP connection. The parser then can parse the TCAP XML script, converting the TCAP XML script into an intermediate format which can be interpreted and executed by the transaction service processors.

In step 355, the parsed call processing script can be transmitted from the parser to the transaction session manager via a TCP/IP connection. The session manager, in step 355, having retained the transaction processor identifier, can identify the transaction service processor associated with the original TCAP event and the received parsed TCAP XML script for processing the TCAP event. In step 360, the transaction session manager can transmit the parsed TCAP XML script to the identified transaction service processor. Accordingly, the transaction service processor can implement the telephony service by executing the parsed TCAP XML script.

Below is an exemplary TCAP XML script that can be utilized for requesting a forwarding directory number for routing a call.

```
<?xml version=1.0"?>
<txml version=1.0">
    <catch event="jain.protocol.ss7.tcap.component.InvokeIndEvent"
    name="request">
        <var name="number"
        expr="Onlinecalendar.getForwardNumber(request.
        getDigits( ).new
        Date( ))"/>
        <object name="provider"expr="request.getProvider( )">/
        <script>
        <![CDATA[
            provider.send Results(number);
        ]]>
        </script>
    </catch>
</txml>
```

The exemplary TCAP XML script illustrates a service which can forward a telephone call to another telephone number based on retrieving the called party's number as specified within an online calendar application, such as Lotus Notes (TM). The online calendar application can specify where a party can be reached at various times of the day. The TCAP XML script can request a forwarding telephone number from the online calendar application and return the forwarding number as a TCAP formatted message. In other words, the TCAP XML script can use a received TCAP event to look up a currently active forwarding number in a calendar application based upon the called number and the current date and time. The TCAP XML script then can get the TCAP provider from the request and use that object to return the result.

The invention disclosed herein provides a solution for developing telephony services in a cost effective and timely manner that is neither telephony switch specific nor dependent upon a developer's knowledge of telephony protocols. The present invention enables one having knowledge of Web applications and XML to implement transaction oriented telephony service features. The present invention also can provide significant improvement with regard to the time needed for telephony service development over conventional switch level development techniques.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of implementing a telephony service in a communication network using a Transaction Capability Application Part (TCAP) processing system, the method comprising:
    receiving a TCAP event from said communication network;
    matching said received TCAP event to a markup language script configured for causing the implementation of said telephony service, the markup language script defining a TCAP markup language script; and
    processing said TCAP markup language script to cause said communication network to implement said telephony service,
    wherein said receiving step further comprises identifying a called directory number from said received TCAP event; and
    wherein said matching step comprises matching said directory number to a network location of said TCAP markup language script, said directory number registered for said TCAP markup language script implementation of said telephony service and retrieving said TCAP markup language script from a data store.

2. The method of claim 1, further comprising prior to said processing step, transmitting said called directory number and said network location of said TCAP markup language script to a transaction session manager.

3. The method of claim 2, further comprising determining with the transaction session manager prior to the processing step the existence of an event context for said received TCAP event in a cache memory.

4. The method of claim 3, further comprising:
    if no event context for said received TCAP event exists in said cache, creating a new event context for said received TCAP event.

5. The method of claim 2, said retrieving comprising:
    providing said network location to a TCAP markup language parser;
    said parser retrieving said TCAP markup language script from said network location;
    parsing said TCAP markup language script into an intermediate format; and
    providing said parsed TCAP markup language script to said transaction session manager.

6. The method of claim 5, said processing step further comprising:
    providing said parsed TCAP markup language script to a transaction service processor for executing said TCAP markup language script.

7. A system for implementing a telephony service in a communication network comprising:
    a transaction service processor having a plurality of addresses of markup language script implementations of telephony services, defining TCAP markup language scripts, associated with a plurality of directory numbers, wherein said transaction service processor is configured to execute parsed TCAP markup language scripts to cause said telephony services to be implemented in the communication network;
    a TCAP markup language parser configured to retrieve said TCAP markup language script implementations of telephony services from said addresses and parse said TCAP markup language scripts; and
    at least one transaction session manager configured to coordinate the operation of said TCAP markup language parser and said transaction service processor by conveying information between said TCAP markup language parser and said transaction service processor based on information received via a media gateway of the communication network.

8. The system of claim 7, wherein said transaction service processor, said TCAP markup language parser, and said transaction session manager each run within at least one independent virtual machine.

9. The system of claim 8, wherein said TCAP markup language parser, said transaction service processor, and said at least one transaction session manager are each disposed in a separate computing machine.

10. The system of claim 7, further comprising:
    a TCAP event processor configured to receive TCAP events from a signaling network and provide said TCAP events to said transaction service processor.

11. The system of claim 10, further comprising:
    a data store including said TCAP markup language scripts.

12. The system of claim 11, further comprising:
    a server communicatively linked to said data store and said TCAP markup language parser for facilitating the retrieval of said TCAP markup language scripts.

13. The system of claim 12, further comprising:
    a cache memory disposed between said transaction session manager and said TCAP markup language parser configured to store frequently retrieved TCAP markup language scripts.

14. The system of claim 7, further comprising:
    a call processor unit configured to receive calls, said call processor unit having a plurality of addresses of voice markup language document implementations of telephony services associated with said plurality of directory numbers;
    a voice markup language parser configured to retrieve said voice markup language documents from said addresses and parse said voice markup language documents responsive to receiving said calls;

a service processor configured to execute said parsed voice markup language documents to cause said telephony services to be implemented in said communications network; and at least one session manager configured to coordinate the operation of said voice markup language parser and said service processor.

15. A tangible machine-readable storage, having stored thereon a computer program having a plurality of code sections executable by a machine for causing the machine to perform the steps of:

receiving a TCAP event from a communication network;

matching said received TCAP event to a markup language script configured for causing the implementation of said telephony service the markup language script defining a TCAP markup language script; and processing said TCAP markup language script to cause said communication network to implement said telephony service;

wherein said receiving step further comprises identifying a called directory number from said received TCAP event, and wherein said matching step comprises matching said directory number to a network location of said TCAP markup language script, said directory number being registered for said TCAP markup language script implementation of said telephony service and retrieving said TCAP markup language script from a data store.

16. The method of claim 15, further comprising prior to said processing step, transmitting said called directory number and said network location of said TCAP markup language script to a transaction session manager.

17. The method of claim 16, further comprising prior to said processing step, determining with the transaction session manager prior to the processing step the existence of an event context for said received TCAP event in a cache memory.

18. The method of claim 17, further comprising prior to said processing step, if no event context for said received TCAP event exists in said cache, creating a new event context for said received TCAP event.

19. The method of claim 17, said retrieving comprising:

providing said network location to a TCAP markup language parser;

said parser retrieving said TCAP markup language script from said network location;

parsing said TCAP markup language script into an intermediate format; and providing said parsed TCAP markup language script to said transaction session manager.

20. The machine-readable storage of claim 19, said processing step further comprising:

providing said parsed TCAP markup language script to a transaction service processor for executing said TCAP markup language script.

* * * * *